United States Patent [19]

Kozawa et al.

[11] Patent Number: 4,609,939
[45] Date of Patent: Sep. 2, 1986

[54] METHOD OF AND APPARATUS FOR AUTOMATICALLY CORRECTING POSITION OF TV CAMERA

[75] Inventors: Kunio Kozawa, Toyota; Soichi Ishikawa, Nagoya; Mamoru Yoshida, Toyota, all of Japan

[73] Assignee: Toyota Jidosha Kabushiki Kaisha, Aichi, Japan

[21] Appl. No.: 631,761

[22] Filed: Jul. 17, 1984

[30] Foreign Application Priority Data

Jul. 18, 1983 [JP] Japan ................. 58-130626

[51] Int. Cl.⁴ .......................... H04N 7/18; G01J 1/00
[52] U.S. Cl. .................................. 358/101; 356/121; 358/107; 358/125; 358/210
[58] Field of Search ............... 358/93, 101, 107, 125, 358/126, 210; 356/121

[56] References Cited

U.S. PATENT DOCUMENTS

| | | | |
|---|---|---|---|
| 4,120,589 | 10/1978 | Mima | 356/121 |
| 4,285,004 | 8/1981 | Morrison | 358/210 |
| 4,400,731 | 8/1983 | Brown | 358/107 |
| 4,412,121 | 10/1983 | Kremers | 358/107 |
| 4,511,918 | 4/1985 | Lemelson | 358/107 |

FOREIGN PATENT DOCUMENTS

| | | |
|---|---|---|
| 26042 | 3/1978 | Japan . |
| 64634 | 6/1981 | Japan . |
| 57-59125 | 4/1982 | Japan ................. 356/121 |
| 111430 | 7/1982 | Japan . |
| 111431 | 7/1982 | Japan . |
| 111432 | 7/1982 | Japan . |

Primary Examiner—Howard W. Britton
Attorney, Agent, or Firm—Parkhurst & Oliff

[57] ABSTRACT

Disclosed is a method of correcting the position of a TV camera for taking up the image of an object to produce video signals of the image, suitable for use in, for example, automotive headlamp beam testing system. The images of reference points which are provided for the purpose of correcting the TV camera position are taken up by the TV camera. Then, the position data representing the positions of the reference points in the field of vision of the TV camera is determined. The position data are compared with predetermined reference point data representing the positions of the reference points in the field of vision of the TV camera as obtained when the TV camera is in the correct position, thereby determining the amount of deviation of the TV camera. Then, the driving unit is operated in accordance with the thus determined amount of deviation to adjust the optical axis of said TV camera so as to eliminate the deviation of the TV camera position. Disclosed also is a method in which the measurement data obtained through the TV camera is corrected in accordance with the amount of deviation of the TV camera, as well as an apparatus suitable for carrying out these methods.

12 Claims, 6 Drawing Figures

FIG. I
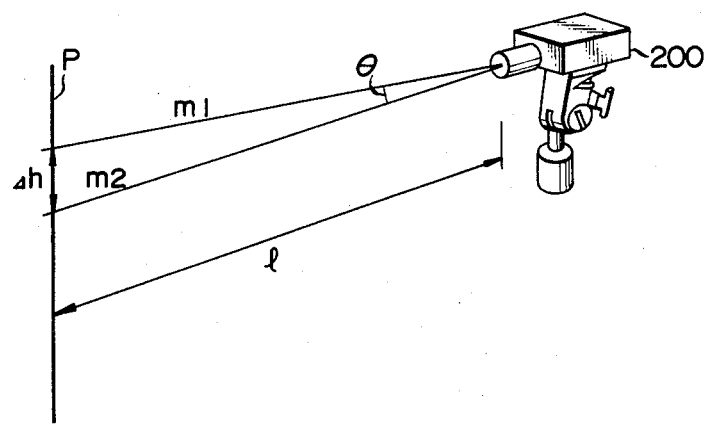
FIG.2
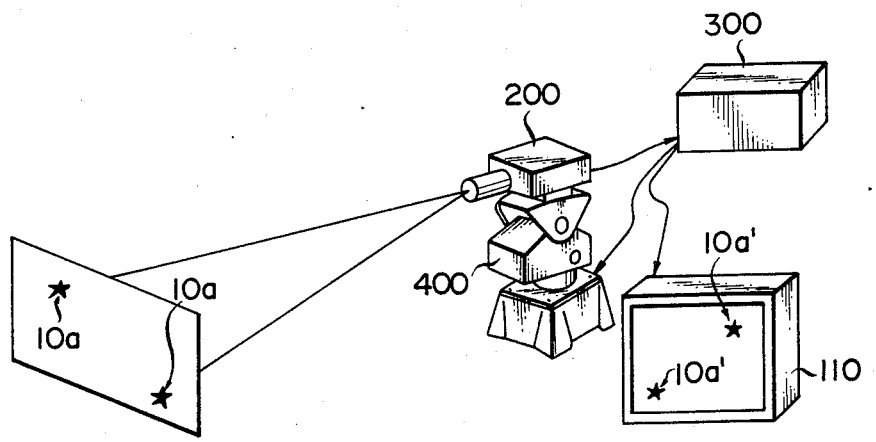

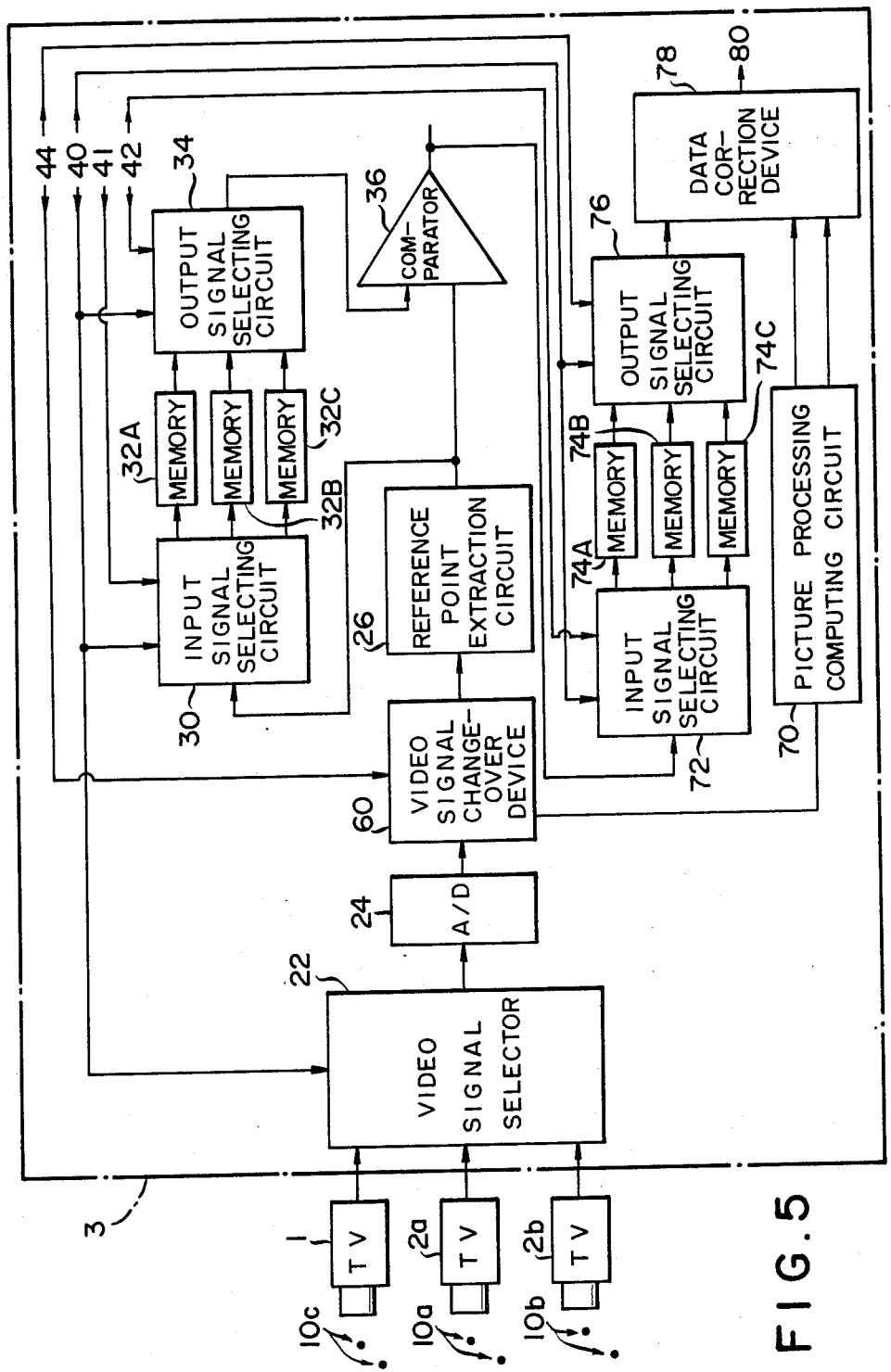
F I G. 5

METHOD OF AND APPARATUS FOR AUTOMATICALLY CORRECTING POSITION OF TV CAMERA

BACKGROUND OF THE INVENTION

The present invention relates to a method of and apparatus for automatically correcting position of a TV camera which takes the image of an object for measuring desired data concerning the object, through elimination of any deviation of the TV camera position from the correct position. More particularly, the invention is concerned with a method of and apparatus for correcting the position of a TV camera, suitable for use in a system for examining the beam axis alignment of automotive headlamp in an automobile assembly line.

Systems for measuring various data of an object by means of a TV camera have been known, a typical example of which is a system for examining the beam axis alignment of automotive headlamp in an automobile assembly line. In the known system for examining the automotive beam axis alignment, the measurement is made on an assumption that the TV camera for taking up the screen image of the light distribution pattern of the headlamp beam applied to a screen is always positioned correctly relative to the screen.

As a matter of fact, however, the position of the TV camera is often deviated from the correct position due to an inferior environmental condition of the system, e.g., vibration or the like. Such a deviation of the TV camera position causes the following problem. Referring to FIG. 1, if the mounting position of the TV camera 200 is deviated from the correct position, the optical axis of the TV camera 200 is deviated by an angle $\theta$ from the correct position m1 to a wrong position m2. This deviation causes a measurement error of $\Delta h$ on the plane P of screen. This measurement error $\Delta h$ is expressed by $\Delta h = 1 \tan \theta$, representing the distance between the TV camera 200 and the screen plane P by 1. Thus, measurement error is caused to seriously impair the reliability of the measurement data even by a slight deviation of the TV camera position. To obviate this problem, hitherto, the position of the TV camera relative to the screen is checked periodically. Unfortunately, however, a visual check by the operator's eyes is the only effective measure for checking the TV camera position. The conventional checking method involved also problems concerning the mounting precision.

SUMMARY OF THE INVENTION

Accordingly, it is a primary object of the invention to provide a method of and apparatus for automatically correcting the deviation of TV camera position, wherein the amount of deviation of the TV camera from the correct position is detected by means of video information taken up by the TV camera so as to permit an automatic and highly precise correction of TV camera position, thereby overcoming the above-described problem of the prior art.

It is another object of the invention to provide a method of and apparatus for automatically correcting a measurement data obtained in accordance with a video signal from a TV camera so as to negate an influence of the deviation of the position of the TV camera on the measurement data.

According to one aspect of the invention, a reference point for the correction of the TV camera position is disposed in the vicinity of an objective image. The position of the reference point in the field of vision of TV camera, as obtained when the TV camera is correctly positioned, is beforehand stored as a reference point data. For correcting the position of the TV camera, the present data concerning the reference point in the field of vision of the TV camera, taken up by this TV camera, is compared with stored reference point data, thereby determining the amount of deviation of the present TV camera position from the correct position, and the optical axis of the TV camera is adjusted by means of a driving device so as to eliminate the deviation.

According to another aspect of the invention, an indirect correction of the TV camera optical axis is performed by correcting, in accordance with the amount of deviation obtained by the above-described method, the measured data determined on the basis of the video signals of the object produced by the TV camera.

The above and other objects, features and advantages of the invention will become clear from the following description of the preferred embodiments when the same is read in conjunction with the accompanying drawings.

BRIEF DESCRIPTION OF THE DRAWINGS

FIG. 1 is an illustration of the relationship between the deviation of TV camera position and the resulting error in the measurement data;

FIG. 2 is an illustration of a method in which the image of a reference point on a screen is taken by a TV camera and displayed on a monitor TV;

FIG. 5 is a block diagram of an embodiment of an apparatus of the invention for correcting the measured data taking the deviation of the camera position into account.

DESCRIPTION OF THE PREFERRED EMBODIMENTS

Before turning to the detailed description of the preferred embodiment, the principle of the invention will be described hereinunder with specific reference to FIG. 2. Two characteristic points 10a (referred to as "reference points", hereinunder) are fixedly provided on a screen on which the objective image is to be projected. The images of these reference points 10a are taken up by a TV camera 200 and are displayed on a monitor TV 110. At the same time, the positions of these reference points are detected in terms of coordinate values on an X-Y coordinate assumed on the picture surface of the monitor TV. These coordinate values are compared with reference coordinate values which represent the position of the reference points as determined when the TV camera is positioned correctly, so that the deviation of the TV camera position from the correct position is determined. Then, the optical axis of the TV camera is moved to negate the deviation thereby automatically correcting the TV camera position. Alternatively, the measured data produced on the basis of the video signal from the TV camera is corrected in accordance with the amount of deviation determined by the above-described method.

Figure 3:
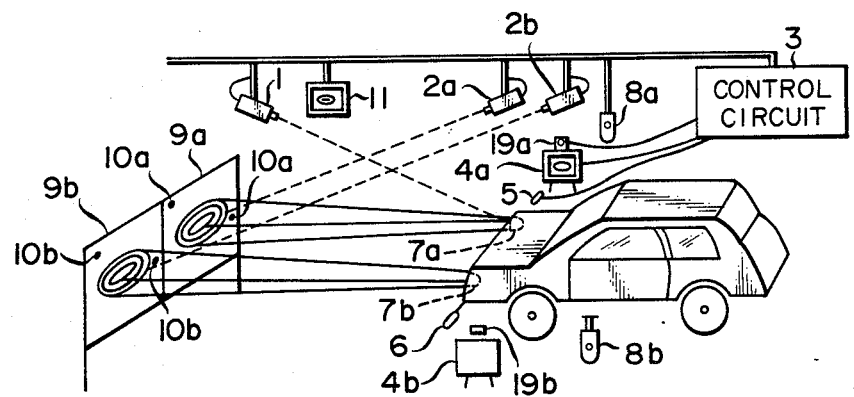
FIG. 3 shows the general arrangement of a system for examining the beam axis alignment of automotive headlamps, the system incorporating an apparatus in accordance with the invention.

A first embodiment of the invention will be described hereinunder with reference to FIGS. 3 and 4. Referring first to FIG. 3 which shows the general arrangement of a system making use of the invention and adapted for examining the alignment of automotive headlamp beam axis, the system has a TV camera 1 for measuring the height of the lamp center hanging from a ceiling so as not to hinder the movement of automobiles along the inspection line. Photoelectric switch composed by a pair of elements 5 and 6 is provided to detect the arrival of the automobile at the predetermined examination position. The photoelectric switch is adapted to produce signal for allowing the TV camera 1 to take up the image of the headlamp 7a (7b) directly applied to the TV camera 1. Reference numeral 11 denotes a monitor TV adapted to display the position of the geometrical center of the thus taken image of the headlamp beam from the headlamp 7a (7b). The position of this geometrical center is used as the value of the height of the lamp center. Screens 9a (for right headlamp) and 9b (for left headlamp) onto which the beams from the headlamps are projected are provided. Numeral references 2a and 2b denote TV cameras for the right and left headlamps which take up the illumination patterns on these screens, respectively. The outputs of these TV cameras 2a and 2b are connected to a control circuit 3 which is adapted to receive the video signals therefrom so as to make a picture processing such as binary coding, in order to determine the positions of the beam axes and compensate the deviation of the position of the TV cameras 1, 2a and 2b. The outputs of the control circuit 3 are connected to monitor TVs 4a (for right headlamp) and 4b (for left headlamp), respectively, which display the results of the processing. The examination is adapted to be started as the inspector or operator pushes a start button 8a (for right headlamp) or 8b (for left headlamp) depending on which one of the headlamps 7a and 7b is to be examined first. Pushing of the start button is adapted to cause a "+" mark to be displayed on the minitor TV 4a (4b). This "+" mark represents the position of the geometrical center of a closed curved area which is surrounded by a closed curve representing a predetermined same illumination intensity in the light distribution pattern on the screen. The evaluation as to whether the beam axis alignment is acceptable or not is made by judging the "+" mark falls within an area (referred to as "window", hereinunder) representing the allowable range which has been corrected in accordance with the measured automobile height. If the "+" mark does not fall within the area of the window, the beam axis is adjusted until the "+" mark becomes to fall within the window area. When the "+" mark is found to fall within the area of the window, a pilot lamp 19a (for the right headlamp) or 19b (for the left headlamp) lights to inform the inspector of the fact that the beam axis has been aligned to an acceptable level. Two reference marks 10a,10a in the form of solid dots are provided on the screen 9a, while the screen 9b has similar reference marks 10b,10b. These reference marks are for correcting the positions of the TV cameras.

The control circuit 3 has a circuit for picture processing, as well as a circuit for performing the automatic correction of the TV camera position in accordance with the invention. An example of the circuit for the automatic correction of TV camera position is shown in FIG. 4, together with the illustration of TV cameras carried by TV camera driving units.

Referring to the drawings, the outputs of the TV cameras 1,2a and 2b are connected to the input of a video signal selector 22 which is under the control of a camera selection signal 40 delivered from a central processing unit (CPU) which is not shown. The camera selection signal 40 is set by a switch which is not shown, so that the output from one of the TV cameras 1,2a and 2b selected by the camera selection signal 40 is delivered by the video signal change-over device 22.

The output from the video signal change-over device 22 is connected to an analog-to-digital converter (referred to as "A/D converter", hereinunder) 24 which converts the analog video input signal into a digital signal.

The video signal from the TV camera contains not only signals representing the image obtained through a scanning but also horizontal and vertical synchronizing signals. In general, the signals representing the image obtained through the scanning take positive values, while the horizontal and vertical synchronizing signals take negative values. Representing the level of the synchronizing signal by "0" while representing the video signal of white image by "100", the level of the video signal of a black image is expressed by "20" for example. It is, therefore, possible to distinguish, by means of the output signal from the A/D converter 24, the horizontal and vertical synchronizing signals, video signals of the reference marks 10a to 10c which are black dots, and the video signals of white grounds of screens 9a,9b. In addition, the reference mark 10c is used to correct the position of the TV camera 1 which directly receives the light beam from the headlamp. This mark is provided on a flat plate and is taken up by the TV camera 1 only when the correction of position is necessary.

The output from the A/D converter 24 is connected to the input of a reference point extracting circuit 26. The reference point extraction circuit 26 may comprise a counter which is started by a vertical synchronizing signal and adapted to be stepped one by one until it stops to operate in response to a video signal which represents the reference marks 10a,10b or 10c; a time counter which starts to count the time in response to each horizontal synchronizing signal and continues the counting until a video signal representing the reference point 10a,10b or 10c is discriminated, and a circuit for discriminating various signals mentioned before according to their levels. The output of the reference point extracting circuit 26 is connected to an input signal selection circuit 30 and also to one of the inputs of a digital comparator 36. The input signal selecting circuit 30 has three outputs which are connected to memories 32A,32B and 32C, respectively. The aforementioned camera selection signal 40 is delivered to the control terminal of the input signal selecting circuit 30, so that the signal delivered by the reference point extracting circuit 26 to the selecting circuit 30 is inputted to one of the memories 32A–32C, in accordance with the camera selection signal 40. The selecting circuit 30 receives also a reference point set signal 41 outputted from the CPU in response to the operation of a switch (not shown) for setting in the memories 32A to 32C the reference point data representing the positions of the reference points 10a to 10c. The selecting circuit 30 is adapted to pass the input signal supplied thereto only when the set signal 40 exists. Thus, the meories 32A to 32C store the data concerning the positions of the reference marks 10a to 10c in terms of X-Y coordinate values. The memories 32A to 32C are connected to an output signal selecting circuit 34. The selecting circuit 34 receives the aforementioned camera selection signal 40, as well as a reference point checking signal 42 which is outputted from the CPU in response to a switch (not shown) for effecting the correction of the TV camera position. The arrangement is such that the data stored in one of the memories 32A to 32C is selected by the camera selection signal 40, and the selected data is outputted only when the reference point checking signal 42 exists.

The output of the output signal selecting circuit 34 is connected to the other input terminal of the comparator 36. The comparator 36 is adapted to compare the reference point data of reference marks stored in the memories 32A to 32C with the position data of the reference marks image taken up by the TV cameras and delivered through the reference point extraction circuit 26. The output of the comparator 36 is connected to a voltage converter 50. The voltage converter 50 includes an A/D converter and produces a voltage digital signal of a level corresponding to the differential signal from the comparator 36. The output from the voltage converter 50 is connected to camera driving controllers 17a to 17c for the TV cameras 1,2a and 2b, so that the voltage signal from the voltage converter 50 is delivered to one of the camera driving controllers 17a to 17c in accordance with the camera selecting signal which is being received by the control terminal of the voltage converter 50. The outputs of the camera driving controllers 17a to 17c are connected to TV camera driving units 18a to 18c, respectively, so that the camera driving units 18a to 18c rotate around horizontal and vertical axes in accordance with the output signals from corresponding controllers 17a to 17c. The camera driving controller 17a to 17c may be, for example, a device manufactured by MATSUSHITA under the model name of WV-7370, while the camera driving units 18a to 18c may be, for example, WV-7270 also manufactured by MATSUSHITA.

The TV camera position correcting apparatus of the invention having the described construction operates in a manner which will be explained hereinunder.

When the cameras 1,2a and 2b are in correct positions, the reference point data corresponding to the reference points 10a to 10c are set in the reference point data memory circuits 32A,32B and 32C in the following manner. As the reference point set switch (not shown) and the camera selecting switch (not shown) are operated, the camera selection signal 40 is delivered from the CPU to the video signal selector 22, input signal selection circuit 30 and the output signal selection circuit 34, while a reference point set signal 41 is delivered to the input signal selection circuit 30. The video signals of two reference points 10a,10b or 10c, taken up by one of the TV cameras 1,2a and 2b specified by the camera selection signal 40, are selected by the video signal selector and the thus selected video signal are delivered to the A/D converter 24. The video signals of the reference points are converted into digital signals by the A/D converters 24, so that the positions of two reference points are determined by the reference point extracting circuit 26 as coordinate signals representing the X-Y coordinate values of these positions on an X-Y coordinate system assumed on the monitor TV 11 (see FIG. 3).

To explain in more detail, as each of the video digital signals is supplied to the reference point extracting circuit 26, the counter for counting the horizontal synchronizing signals is reset and set in response to the detection of a vertical synchronizing signal from the video signal. This counter is stepped one by one each time the horizontal syncronizing signal is received, and stops the counting operation when the signal representing the reference mark is detected from the video signal. Consequently, the content of this counter represents the Y coordinate value of the reference point. The time counter starts to count the time when a horizontal synchronizing signal is detected from the video signal, and stops its counting operation when the signal representing the reference mark is detected. This counting operation is conducted for each scanning cycle. Thus, the content of the time counter represents the X coordinate value of the reference mark.

The coordinate signals from the reference point extracting circuit 26 are stored, as the reference point data representing the coordinate values of the reference marks obtained when the TV camera is positioned correctly, in one of the reference point data memory circuits 32A,32B and 32C selected by the camera selection signal 40, by way of the input signal selecting circuit 30.

Then, the reference point check switch (not shown) for correcting the position of the TV cameras 1,2a and 2b, as well as a switch (not shown) for specifying the TV camera to be subjected to the position correction, are operated to permit the CPU (not shown) to deliver the camera selection signal 40 to the video signal selector 22, input signal selecting circuit 30, output signal selecting circuit 34 and the voltage converter 50, and to deliver the reference point checking signal 42 to the output signal selecting circuit 34. In consequence, as in the case of the setting of the reference point data in the reference point data memory circuits 32A to 32C, the coordinate signals of two reference points taken up by the specified TV camera are delivered from the reference point extracting circuit 26 to the input signal selecting circuit 30 and one of the input teminals of the comparator 36. In this state, however, the input signal to the input signal selecting circuit 30 is gated, so that the contents of the memory circuits 32A to 32C are never changed in this case.

On the other hand, the output signal selecting circuit 34 receives the camera selection signal 40 and the reference point check signal 42. Therefore, the reference point data memory circuit, which stores the reference point data of two reference points taken up by the TV camera specified by the selection signal 40, delivers the reference point data to the other input terminal of the comparator 36 through the output signal selection circuit 34. The comparator 36 compares the coordinate signals with the reference point data and produces a detection signal (comparison signal) 43 corresponding to the amount of deviation of the present TV camera position from the correct position of the TV camera. The detection signal 43 is then delivered through the voltage converter 50 to the camera controller 17a,17b or 17c associated with the TV camera the position of which is to be corrected. The camera controller then delivers a driving signal to the associated camera driving units 18a,18b or 18c so that the driving unit drives the TV camera to the correct position thus automatically accomplishing the correction of the TV camera position.

To explain in more detail, the coordinate signal representing the position of each reference point includes X and Y coordinate components and, under the control of the CPU, the digital comparator 36 compares each coordinate component with the corresponding coordinate component of the reference point data stored in the memory circuits 32A to 32C, and supplies the comparison signal 43 of each coordinate component to the voltage converter 50. The voltage converter 50 receives two comparison signals 43 for each of two reference points successively received for the specified TV camera, i.e. four comparison signals 43 in total, and conducts predetermined computation on these four comparison signals to obtain a result which represents the amount of driving of the TV camera in digital form. This result is converted into an analog signal by a D/A converter, and is delivered to the TV camera controller 17a,17b or 17c which in turn delivers a driving signal to the associated TV camera driving unit 18a,18b or 18c. Consequently, the TV camera specified by the camera selection signal 40 is rotated horizontally or vertically to eliminate the deviation of the position, thereby accomplishing the correction of position.

Figure 4:
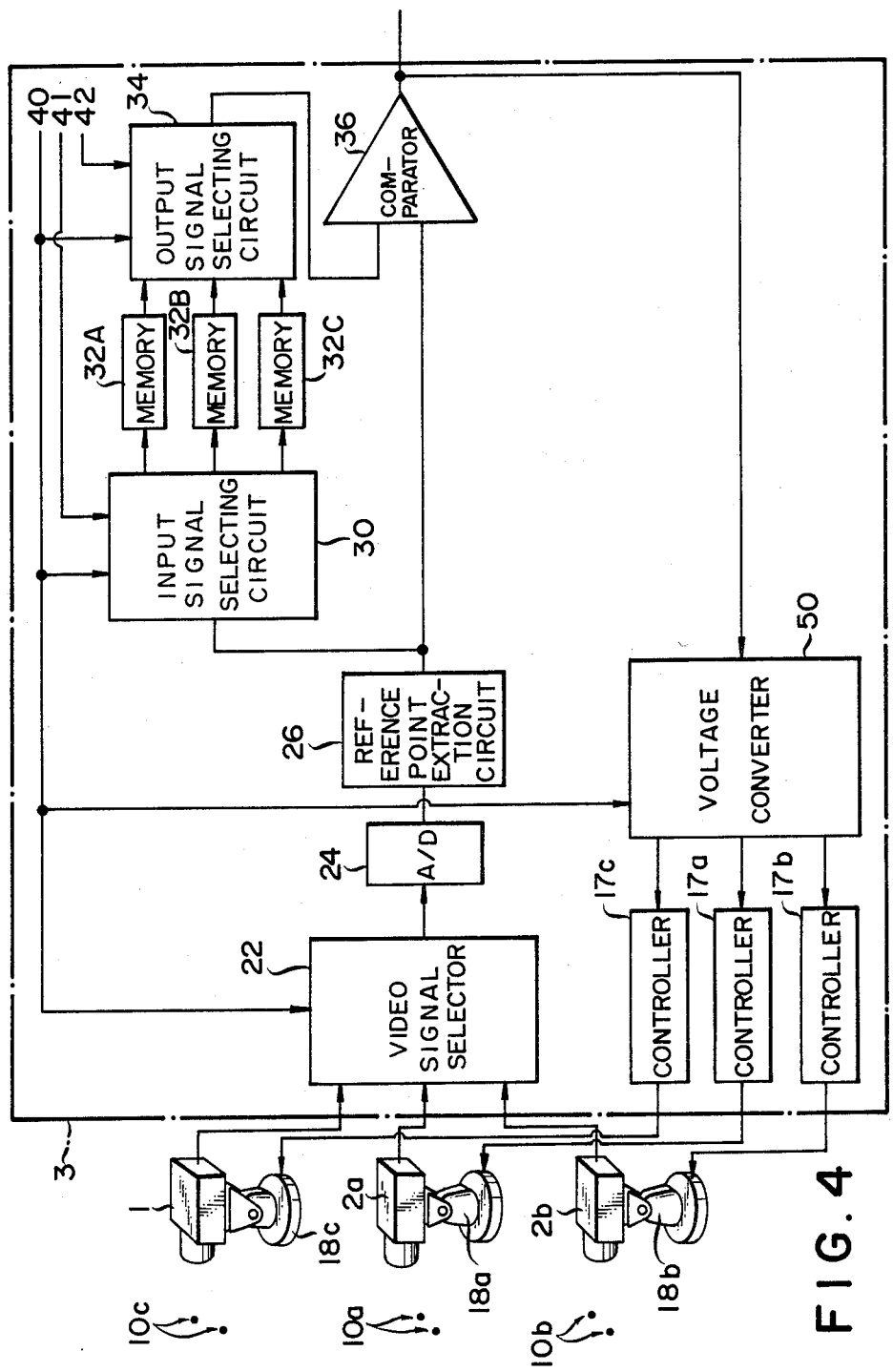
FIG. 4 is a block diagram of an embodiment of the apparatus of the invention for correcting the position of a TV camera.

Note that the picture processing circuit for conducting a predetermined picture processing on the video signals from the TV cameras, for determining the positions of the headlamp beam axes, is omitted from FIG. 4.

FIG. 5 shows another embodiment of the invention which is adapted to automatically correct the measured data in response to the detected amount of deviation of the TV camera position. In contrast to the embodiment shown in FIG. 4 in which the TV camera itself is driven to the correct position so as to eliminate any deviation from the correct position, the embodiment shown in FIG. 5 is intended for automatically correcting the measured data in accordance with the detected amount of deviation of camera position, instead of moving the TV camera to the correct position. In FIG. 5, the same reference numerals are used to denote the same parts or members as those used in FIG. 4.

The output frm the A/D converter 24 is connected to a signal change-over device 60. The signal change-over device 60 has two outputs which are connected to a reference point extraction circuit 26 and a computing circuit 70 for picture processing, respectively. The signal change-over device 60 has a control terminal which receives a correction/measuring signal 44. When this signal 44 indicates that the deviation of the TV camera position should be corrected, the A/D converter 24 is connected to the reference point extraction circuit 26, whereas, when the signal 44 indicates that the measurement should be made, the A/D converter 24 is connected to the computing device 70.

The output from the comparator 36 is connected to a deviation data input signal selecting circuit 72 which has three outputs connected, respectively, to memories 74A, 74B and 74C. The input signal selecting circuit 72 has a control terminal which receives the aforementioned camera selecting signal 40, so that the signal inputted to the selecting circuit 72 is received by one of the memories selected in accordance with the camera selecting signal 40. The control terminal also receives a reference point checking signal 42 which is delivered by the CPU in response to the operation of a switch (not shown) for correcting the TV camera position. The selecting circuit 72 permits the input signal to pass therethrough only when this checking signal 42 is available. The memories 74A to 74C store the comparison results representing the amounts of deviations, delivered by the comparator 36. These memories 74A to 74C are connected to a signal selecting circuit 76 the control terminal of which receives the aforementioned camera selecting signal 40 and the correction/measuring signal 44. The arrangement is such that the data stored in the memory 74A,74B or 74C is selected by the camera selection signal 40, and the thus selected data is outputted from the signal selecting circuit only when the correction/measuring signal 44 representing that the measurement is to be made is supplied to the signal selecting circuit 76. The output from the output signal selecting circuit 76 is connected to a data correction device 78 to which connected also is the output of the computing device 70.

Figure 6:
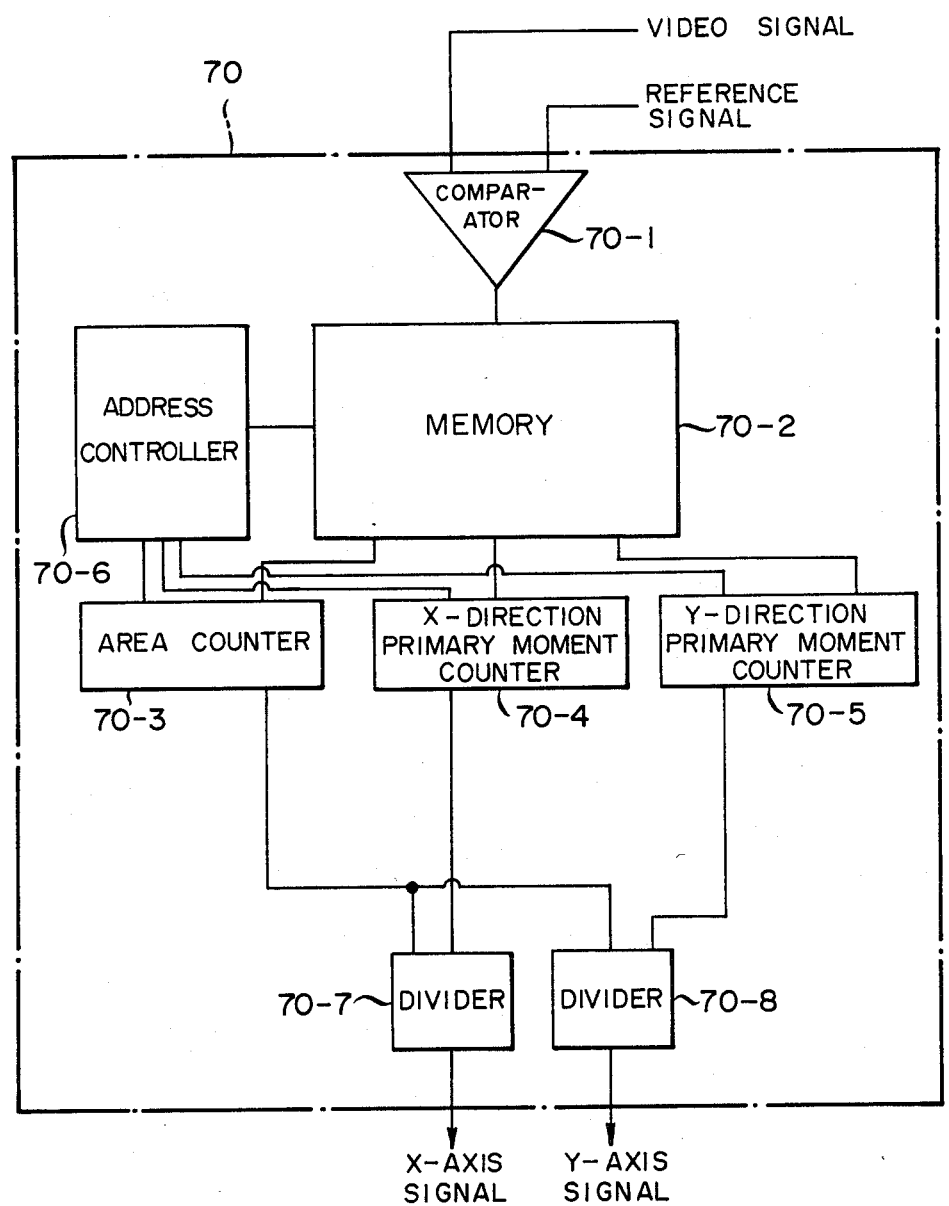
FIG. 6 is a block diagram showing the detail of a practical example of a picture processing computing device.

The detail of the computing device 70 will be explained with specific reference to FIG. 6. The computing device 70 has a digital comparator 70-1 having two input terminals: namely, an input terminal for receiving the digital video signal after an A/D conversion by the A/D converter 24, and another input terminal which receives a reference signal for determining a quantizing level. The reference signal thus supplied to the comparator 70-1 determines the closed curved area surrounded by the line indicative of the same illumination intensities higher than a predetermined level, in the image taken up by the TV camera. The output of the comparator 70-1 is connected to a memory 70-2. The image taken up by the TV camera is stored in the form of digital picture signals of 256×256, for example. An area counter 70-3, X-direction primary moment counter 70-4, Y-direction primary moment counter 70-5 and an address controller 70-6 are connected to the memory 70-2.

The area counter 70-3 is adapted to determine the area of the closed curved area mentioned before, by counting the number of picture signals taking a state such as "1" representing that the points corresponding to such picture signals fall within the closed curved area.

The X-direction primary moment counter 70-4 counts the X-direction primary moment in the following manner. It is assumed here that the address in the memory is expressed by a matrix consisting of i lines and j columns, and the picture signal on the address ij is expressed by Pij. Thus, the picture signals of addresses falling within the closed curved area is expressed as Pij=1, while the picture signals falling out of the closed area is expressed by Pij=0. In this system, the primar moment in X direction is given by $\Sigma\Sigma i \cdot Pij$. Therefore, the counter 70-4 determines the primary moment in X direction by counting $\Sigma\Sigma i \cdot Pij$. Similarly, the Y-direction primary moment counter 70-5 determines the Y-direction primary moment by counting $\Sigma\Sigma j \cdot Pij$.

The area of the closed curved area, counted by the area counter 70-3, is represented by $\Sigma\Sigma Pij$. Then, the position (Gx,Gy) of the geometrical center of the closed curred area is expressed by the following formula (1).

$$(Gx, Gy) = \left( \frac{\Sigma\Sigma i \cdot Pij}{\Sigma\Sigma Pij}, \frac{\Sigma\Sigma j \cdot Pij}{\Sigma\Sigma Pij} \right) \quad (1)$$

The area counter 70-3, X-direction primary moment counter 70-4 and the Y-direction primary moment counter 70-5 are connected to dividers 70-7 and 70-8. The divider 70-7 is for determining the X coordinate value of the centroid of the closed curved area, while the divider 70-8 is for determining the Y coordinate value of the same. The divider 70-7 conducts a computation of $\Sigma\Sigma i \cdot Pij/\Sigma\Sigma Pij$ upon receipt of the outputs from the area counter 70-3 and the X-direction primary moment counter 70-4, thereby producing a signal representing the X coordinate position Gx of the geometrical center. Similarly, the divider 70-8 conducts a computation of $\Sigma\Sigma j \cdot Pij/\Sigma\Sigma Pij$, upon receipt of the outputs from the area counter 70-3 and the Y-direction primary moment counter 70-5, thereby producing a signal representing the Y coordinate position Gy of the geometrical center.

The data correction device 78 is constructed such that the sum of the X coordinate components of digital signals representing the amounts of deviations of two reference points, as well as the sum of Y coordinate components of the same is carried out to compute the real amounts of deviation in both coordinate components, and the X coordinate data and Y coordinate data from the computing device 70 are corrected in accordance with the real amounts of deviation.

The operation of the embodiment shown in FIG. 5 is as follows.

When the TV cameras 1,2a and 2b are in correct positions, the reference point data are set in the reference point data memory circuits 32A to 32C in a manner which is substantially identical to that of the first embodiment. Therefore, no further explanation will be needed in this regard. In the described embodiment, the signal change-over device 60 is switched by the correction/measurement change-over device 60 so that the video signal is delivered to the reference point extraction circuit 26.

When the position of the TV camera 1,2a or 2b is deviated from the correct position, the deviation data representing the amount of position deviation is set in the position deviation memory circuit 74A,74B or 74C corresponding to this camera, in a manner which will be explained hereinunder. The CPU delivers the camera selection signal 40, reference point checking signal 42 and the correction/measurement signal 24 representing the correction. In response to these signals, as in the case of the setting of the reference point data explained before, the X and Y coordinate values of two reference points taken up by the specified TV camera are delivered through the reference point extraction circuit 26 to the input signal selecting circuit 30 and one of the input terminals of the comparator 36. The other input terminal of the comparator 36 receives the reference point data which is stored in the reference point data memory selected by the output signal selecting circuit 34. The comparator 36 then compares the coordinate signals with the reference point data to produce a comparison signal 43 representing the amount of deviation of the TV camera position and delivers the same to the position deviation data input signal selecting circuit 72. Then, the selecting circuit 72 selects one of the position deviation data memory circuit 74A,74B or 74C to store the detection signal 43 representing the position deviation data.

Then, the measured data is corrected in accordance with the amount of position deviation which is stored in a manner explained hereinbefore. When the correction/measurement signal 44 indicating that the measurement is to be made and the camera selecting signal 40 are delivered to the associated circuits, one of the TV cameras 1,2a or 2b selected by the video signal selector 22 takes up the image of the object, e.g., the image or light pattern of a headlamp beam projected on a screen. The video signals representing the taken up image are converted by the A/D converter 24 into digital signals and are outputted to the computing device 70 through the signal change-over device 60. The digital signals are then quantized by the comparator 70-1. Namely, the digital signals corresponding to the points within the closed curved area in the light projection pattern on the screen are stored as "1" in the memory 70-2, while digital signals corresponding to points out of this closed curved area are stored as "0" in the same. The picture signals in the memory 70-2 are successively outputted to the area counter 70-3 in accordance with the control of the address controller 70-6, so that the output of the area counter 70-3 represents the area of the closed curved area. The picture signals in the memory 70-2 are delivered, under the control of the address controllers 70-6, also to the X-direction primary moment counter 70-4 and Y-direction primary moment counter 70-5, respectively. The counter 70-4 counts the result of multiplication of the picture signals of respective addresses by the values of addresses related to the X direction, while the counter 70-5 counts the results of multiplication of the picture signals of respective addresses by the values of the addresses related to the Y direction.

The output from the X-direction primary moment counter 70-4 and the output from the area counter 70-3 are delivered to a divider 70-7 so that the X coordinate value of the geometrical center of the closed curved area is determined in accordance with the formula (1), and the X coordinate signal representing this position is outputted from the divider 70-7. Similarly, the Y coordinate signal is outputted from the divider 70-8. When the TV camera 2a or 2b has been selected by the camera selection signal, the content of the area counter 70-3 represents the area of the hot zone (closed curved area) on the screen, while the outputs from the dividers 70-7,70-8 represent the X and Y coordinate values of the centroid of the hot zone (closed curved area), i.e., the coordinate position of the headlamp beam axis. When the TV camera for directly receiving the image of the headlamp is selected by the camera selecting signal, the content of the area counter 70-3 represents the area of the closed curved area of the light beam directly applied by the headlamp, while the dividers 70-7,70-8 represent the positions of the centroid of the closed curved area. In this case, it is possible to know the height of the automobile under examination by the Y coordinate signal and, hence, to correct the position of the window which indicates the allowable range of beam axis position on each monitor TV 4a,4b in accordance with the Y-axis signal, i.e., in accordance with the measured heigh of the lamp center.

The X and Y coordinate signals delivered by the computing device 70 are corrected by the data correction device 78 in accordance with the position deviation signals, so that coordinate signals 80 corrected to eliminate the influence of deviation of the TV camera position are obtained. A mark "+" repesenting the position of the headlamp beam axis is displayed on the TV camera 4a or 4b (see FIG. 3) in accordance with the coordinate signals 80, and the headlamp beam axis is adjusted until this "+" mark comes to fall within the area of the window representing the allowable range, if the mark "+" is found to be out of the area of the window.

What is claimed is:

1. A method of automatically correcting a position of a TV camera in a measuring system, in which said TV camera takes an image of an object ot be measured to produce a video signal in order to obtain data of measurement, an optical axis of said TV camera being adjustable by a TV camera driving unit, said method comprising the steps of:
  (a) taking by a TV camera arranged at a pre-determined position an image of a reference point which is provided in a field of vision of said TV camera;
  (b) determining correct position data representing a position of said reference point;
  (c) storing said correct position data obtained in step (b) in memory circuits;
  (d) taking an image of said reference point by a TV camera whose position is to be corrected;
  (e) determining current position data representing a position of said reference point taken by said TV camera whose Position is to be corrected;
  (f) comparing the position data obtained in step (e) with the position data obtained in step (b), thereby determining an amount of deviation of said TV camera to be corrected; and
  (g) operating said TV camera driving unit in accordance with the amount of deviation determined in step (f) to adjust the optical axis of said TV camera so as to eliminate the deviation in the position of said TV camera.

2. A method according to claim 1, wherein said reference point comprises a pair of reference marks on a screen on which said iamge is provided.

3. A method according to claim 1, wherein said object is an automotive headlamp beam which is projected onto a screen in order to check whether said automotive headlamp beam aims at a predetermined direction.

4. A method of automatically correcting measurement data of an object in a measuring system, in which a TV camera takes an image of said object to produce a video signal to obtain said measurement data to eliminate an influence of any deviation in a position of said TV camera from its correct position, said method comprising the steps of:
  (a) taking by a TV camera arranged at a pre-determined position an image of a reference point which is provided in a field of vision of said TV camera;
  (b) determining correct position data representing a position of said reference point;
  (c) storing said correct position data obtained in step (b) in memory circuits;
  (d) taking an image of said reference point by a TV camera whose position is to be corrected;
  (e) determining position data representing the position of said reference point taken by said TV camera;
  (f) comparing the position data obtained in step (e) with the position data obtained in step (b), thereby determining an amount of deviation of said TV camera;
  (g) taking by said TV camera an image of said object to produce a video signal indicating a position of said image;
  (h) processing said video signal to obtain said data of measurement; and
  (i) correcting said measurement data in accordance with the amount of the deviation of the TV camera position.

5. A method according to claim 4, wherein said object is an automotive headlamp beam which is projected onto a screen in order to check whether said automotive headlamp beam aims at a predetermined direction.

6. A method according to claim 5, wherein said measurement data is related to aiming of said automotive headlamp beam, said processing step comprising the steps of:
  specifying a closed curved area surrounded by a line indicative of an illumination intensity higher than a predetermined level in the image taken of a light distribution pattern on said screen; and
  determining a position of a geometrical center of the specified closed curved area in an aiming direction of said headlamp, wherein said geometrical center is corrected in accordance with said amount of the deviation of the TV camera position.

7. An apparatus for correcting a position of a TV camera in a measuring system in which said TV camera is used for taking an image of an object to be measured so as to obtain data of measurement concerning said object, said apparatus comprising:
  a reference mark provided in the vicinity of said object;
  detecting means for detecting, in accordance with a video signal of the image of said reference mark taken by said TV camera, a position of said reference mark in a field of vision of said TV camera;
  storage means for storing reference point data representing the position of said reference mark in the field of vision of said TV camera as determined when said TV camera is in the correct position;
  comparator means connected to said storage means and said detecting means for comparing the position data concerning said reference mark delivered by said detecting means with said reference point data delivered by said storage means so as to produce a comparison signal representing an amount of deviation in the position of said TV camera from said correct position; and
  a TV driving unit connected to said comparator means for adjusting an optical axis of said TV camera in accordance with said comparison signal.

8. An apparatus according to claim 7, further comprising a screen onto which an automotive headlamp beam is projected to provide a light distribution pattern in order to check whether said automotive headlamp beam aims at a predetermined direction.

9. An apparatus according to claim 8, further comprising:
  means for specifying a closed curved area surrounded by a line indicative of illumination intensity higher than a predetermined level in said light distribution pattern on said screen; and
  means for determining a position of a geometrical center of the specified closed curved area in an aiming direction of said headlamp.

10. In a system having a TV camera for taking an image of an object to be measured to produce a video signal so as to obtain data of measurement concerning said object, an apparatus for correcting said data of measurement in accordance with an amount of deviation of position of said TV camera from its correct position thereby eliminating any influence of said deviation on said data of measurement, said apparatus comprising:
  a picture processing device for processing the video signal of said image of said object taken by said TV camera to obtain said data of measurement;

a reference mark provided in the vicinity of said object;

detecting means for detecting, in accordance with the video signal of the image of said reference mark taken by said TV camera, a position of said reference mark in a field of vision of said TV camera;

storage means for storing reference point data representing the position of said reference mark in the field of vision of said TV camera as determined when said TV camera is in the correct position;

comparator means connected to said storage means and said detecting means for comparing the position data concerning said reference mark delivered by said detecting means with said reference point data delivered by said storage means so as to produce a comparison signal representing an amount of deviation in a position of said TV camera from said correct position; and correcting means for correcting, in accordance with said comparison signal, said data of measurement obtained by said picture processing means thereby eliminating any influence of the deviation in the TV camera position on said data of measurement.

11. An apparatus according to claim 10, further comprising a screen onto which an automotive headlamp beam is projected to provide a light distribution pattern in order to check whether said automotive headlamp beam aims at a predetermined direction.

12. An apparatus for correcting the data of measurement according to claim 11, wherein said picture processing device comprises:

means for specifying a closed curved area surrounded by a line indicative of illumination intensity higher than a predetermined level in the taken up image of the light distribution pattern on said screen; and means for determining a position of a geometrical center of the specified closed curved area as an aiming direction of said headlamp, and wherein said correcting means corrects said geometrical center of said closed curved area in accordance with said comparison signal.

* * * * *